United States Patent
Jamieson et al.

(10) Patent No.: US 6,888,798 B2
(45) Date of Patent: May 3, 2005

(54) EMBEDDED MANAGEMENT CHANNEL FOR SONET PATH TERMINATING EQUIPMENT CONNECTIVITY

(75) Inventors: Ross Alexander Jamieson, Plano, TX (US); John Kevin Weeks, Richardson, TX (US); Paul Anthony Elias, Richardson, TX (US); Nimer Ibrahim Yaseen, Allen, TX (US)

(73) Assignee: Covaro Networks, Inc., Richardson, TX (US)

( * ) Notice: Subject to any disclaimer, the term of this patent is extended or adjusted under 35 U.S.C. 154(b) by 0 days.

(21) Appl. No.: 10/830,793

(22) Filed: Apr. 23, 2004

(65) Prior Publication Data

US 2005/0008013 A1 Jan. 13, 2005

Related U.S. Application Data

(60) Provisional application No. 60/464,925, filed on Apr. 23, 2003.

(51) Int. Cl.[7] .............................................. H04L 12/56
(52) U.S. Cl. ...................... 370/236; 370/389; 370/401; 370/467
(58) Field of Search ................................. 370/235, 236, 370/248, 250, 251, 252, 389, 392, 395.5, 400, 401, 467, 469

(56) References Cited

U.S. PATENT DOCUMENTS

| | | | |
|---|---|---|---|
| 6,614,785 B1 * | 9/2003 | Huai et al. | 370/352 |
| 2003/0031177 A1 * | 2/2003 | Robidas et al. | 370/392 |
| 2003/0070007 A1 * | 4/2003 | Tchakmakjian | 709/330 |
| 2003/0123493 A1 * | 7/2003 | Takahashi | 370/539 |

* cited by examiner

Primary Examiner—Chi Pham
Assistant Examiner—Anh-Vu Ly
(74) Attorney, Agent, or Firm—Haynes and Boone, LLP (57) ABSTRACT

Provided are a system and method for transferring management channel information (inband or using path overhead) over a synchronous optical network (SONET). In one example using inband management information, the method includes encapsulating management information in an internet protocol (IP) packet and encapsulating the IP packet in an Ethernet frame. The Ethernet frame is tagged with a management tag to differentiate the frame from the data traffic sent via the network.

16 Claims, 7 Drawing Sheets

EMBEDDED MANAGEMENT CHANNEL FOR SONET PATH TERMINATING EQUIPMENT CONNECTIVITY

CROSS-REFERENCE

This application claims priority from U.S. Provisional Patent Application Ser. No. 60/464,925, filed on Apr. 23, 2003, and entitled "EMBEDDED MANAGEMENT CHANNEL FOR SONET PTE CONNECITVITY," which is hereby incorporated by reference in its entirety.

BACKGROUND

This disclosure relates generally to telecommunications systems and, more particularly, to providing connectivity for management communications between synchronous optical network (SONET) entities over multi-vendor, multi-carrier SONET networks.

SONET (and the counterpart Synchronous Digital Hierarchy (SDH)) is a widely used transport technology in carrier networks, and the deployment of SONET based network equipment accounts for a significant portion of some networks. As the use of SONET equipment increases, the number of vendors involved in designing and manufacturing SONET equipment also increases.

Although vendors are generally supposed to comply with SONET standards to ensure that their equipment is compatible with that of other vendors, SONET equipment from different vendors may not feature such interoperability. For example, SONET data communication channels (DCCS) may use different protocol stacks, such as the Open System Interconnection (OSI) standard or the Transmission Control Protocol/Internet Protocol (TCP/IP) standard. Furthermore, different vendors may implement a protocol stack using proprietary mechanisms, and so the various implementations of the same protocol stack may not be interoperable. For reasons such as this, some SONET systems are even implemented with deactivated DCCs.

Accordingly, what is needed is a system and method for providing connectivity for management communications over multi-vendor, multi-carrier SONET networks.

DETAILED DESCRIPTION

This disclosure relates generally to telecommunications systems and, more particularly, to providing connectivity for management communications between SONET entities over multi-vendor, multi-carrier SONET networks. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

For the purposes of illustrating the present disclosure, various acronyms may be used, the definitions of some of which are listed below:

ADM Add and Drop Multiplexer
CLNS Connectionless Network Service
DCC Data Communication Channel
DA Data Application
DB Data Base
EMS Element Management System
IP Internet Protocol
MIL Management interface layer
MNA Management Network Application
MPL Management protocol layer
MPLS Multiprotocol Label Switching
NMS Network Management System
NT Network Transport
NOC Network Operating Center
OSPF Open Shortest Path First
SDCC Section DCC
SHIM Simple Hardware Interface Manager
SCC Serial Communication Channel
STS Synchronous Transport Signal
SPE Synchronous Payload Envelope
VLAN Virtual Local Area Network As will be described in greater detail below, the following disclosure describes exemplary hardware and software functionality and designs for transferring management information using path terminating network entities (NEs) that may be connected via a complex intermediate network comprising equipment from various SONET vendors and subnetworks owned and managed by multiple different carriers. As will be described below in greater detail, by embedding the management traffic that needs to be transferred between the two path terminating NEs in some portion of a layer of the path, the NEs may support management connectivity.

For purposes of example, the methodology used may be divided into two approaches: (1) If the path is carrying data traffic, the management traffic may be carried by inband (e.g., along with data traffic) frames or packets that may segregated from the customer traffic via a tagging mechanism (e.g., using VLAN tags or MPLS labels); (2) If the path is not carrying data traffic or it is undesirable to use an inband approach, the management information may be inserted into portion of the SONET path overhead (e.g., the F2 User Channel byte and/or the Z1/Z2 growth bytes of the SONET path overhead). It is understood that these approaches need not be exclusive, but are separated in the present disclosure for purposes of clarity.

In a portion of the disclosure, a description is provided of the use of tagged (e.g., using VLAN or other tagging) management tunnels (MGMT tunnels) over an STS Channel (that may normally carry customer traffic) as a management interface. In the present example, the MGMT tunnel may be an alternate connectivity solution to a DCC (section and line), although it is understood that the two solutions may be used in conjunction. A MGMT tunnel over STS channels may terminate on a designated Ethernet-over-SONET entity (e.g., a Covaro CC-16000, such as is available from Covaro Networks of Richardson, Tex.) serving as a management hub. Such a management hub may use, for example, IP over Ethernet tunnels to other network entities on the overlayed network. The MGMT tunnel may serve as a network IP interface and may run IP (including OSPF, CLNS, etc.). It is understood that multiple Ethernet-over-SONET entities and/ or other NEs may be connected together in many different ways using technology such as external LANs, SDCCs, MGMT tunnels, or combinations thereof. Accordingly, the Ethernet-over-SONET entities may route traffic from one interface to another to provide IP connectivity among various nodes.

In the present example, the MGMT tunnel may support two types of encapsulation: IP over PPP (point-to-point protocol) over Ethernet, and IP over Ethernet. For purposes of illustration, the IP over PPP over Ethernet may be used between two Ethernet-over-SONET entities (e.g., two Covaro 16000 devices) able to handle the needed PPP processing. Such entities may also provide link monitoring and alarms using a protocol such as LCP (Link Control Protocol). IP over Ethernet may be used between an Ethernet-over-SONET entity (e.g., a Covaro 16000) and a NOC entity, such as a personal computer (PC), a router, etc., that is not configured for PPP processing. For purposes of clarity, the following description uses the term Ethernet-over-SONET to refer to a network entity that is configured to perform PPP processing.

Figure 1:
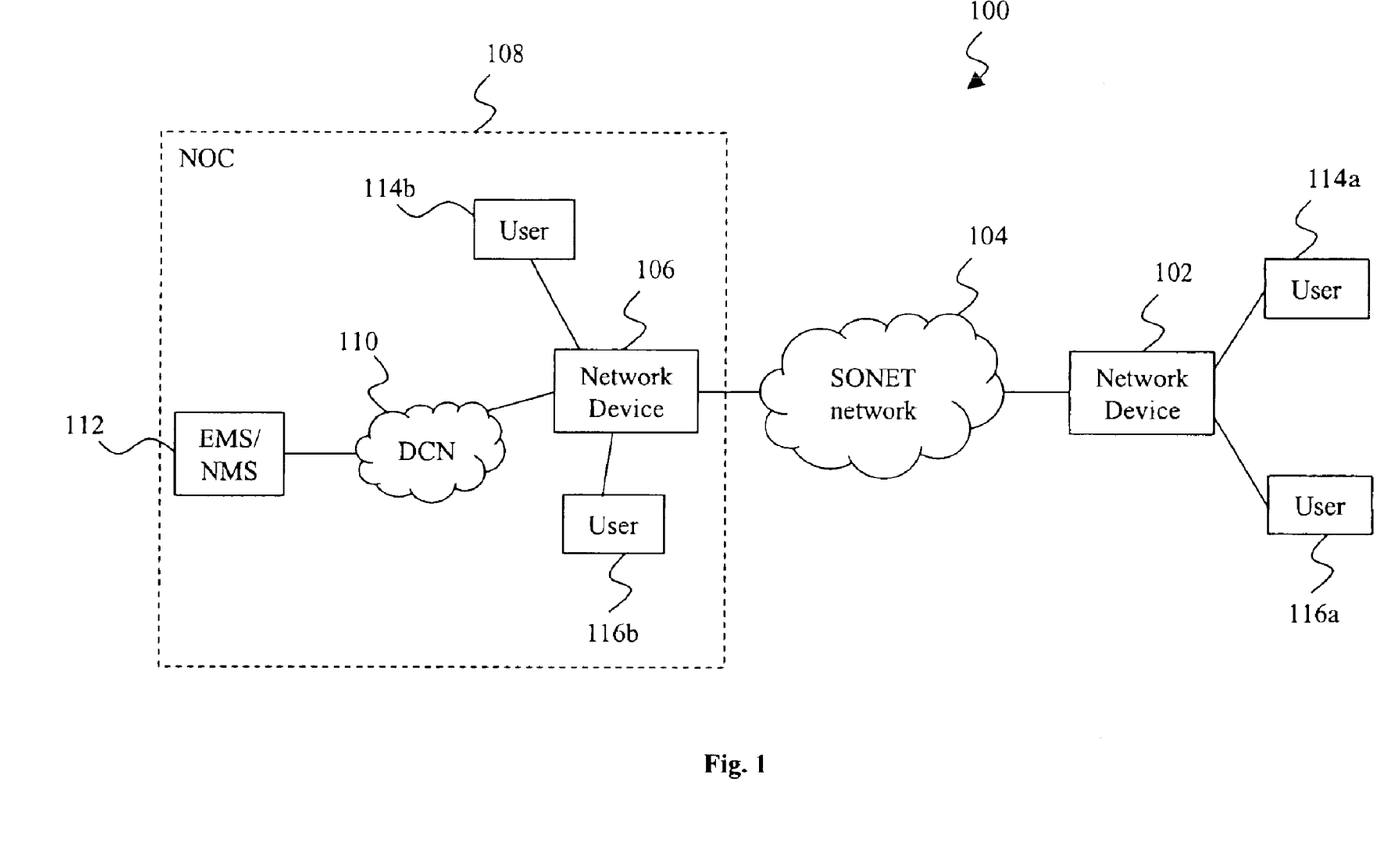
FIG. 1 illustrates one embodiment of an exemplary system having SONET path terminating network entities that may communicate embedded management channel information.

Referring to FIG. 1, one embodiment of an exemplary system 100 is illustrated. The system 100 includes a first network entity 102 connected via a SONET network 104 to a second network entity 106. For purposes of clarity, the term SONET is used throughout the present disclosure to refer to SONET and/or SDH. Accordingly, it is understood that references to SONET may be replaced with references to SDH, although some minor changes may be needed, as will be known to those of skill in the art. Although a network entity in the present disclosure may be any network accessible component, device, or system (hardware and/or software), the network entity 102 is a path terminating Ethernet-over-SONET entity configured to perform PPP processing. The network entity 106 may be either an Ethernet-over-SONET entity or may be a network entity that is not configured to perform PPP processing (e.g., an L2 VLAN capable switch).

In the present example, the network entity 106 is in a NOC 108 that also includes an EMS/NMS 112 connected to the network entity 106 via a data communications network (DCN) 110. Users 114a and 116a may access the network 104 via the network entity 102, while users 114b and 116b may access the network 104 via the network entity 106. It is understood that additional users, network entities, networks, and/or subnets may be connected to various elements of FIG. 1. Accordingly, FIG. 1 is for purposes of example only and has been simplified to better illustrate the present disclosure.

For purposes of example, the system 100 includes three VLANs (not explicitly shown). A first VLAN (referred to hereinafter as VLAN 1) provides connectivity between the users 114a and 114b via the network entities 102, 106 and the network 104. A second VLAN (VLAN 2) provides connectivity between the users 116a and 116b. A third VLAN (VLAN 3) provides management tunnel connectivity between the network entities 102, 106.

Figure 3:
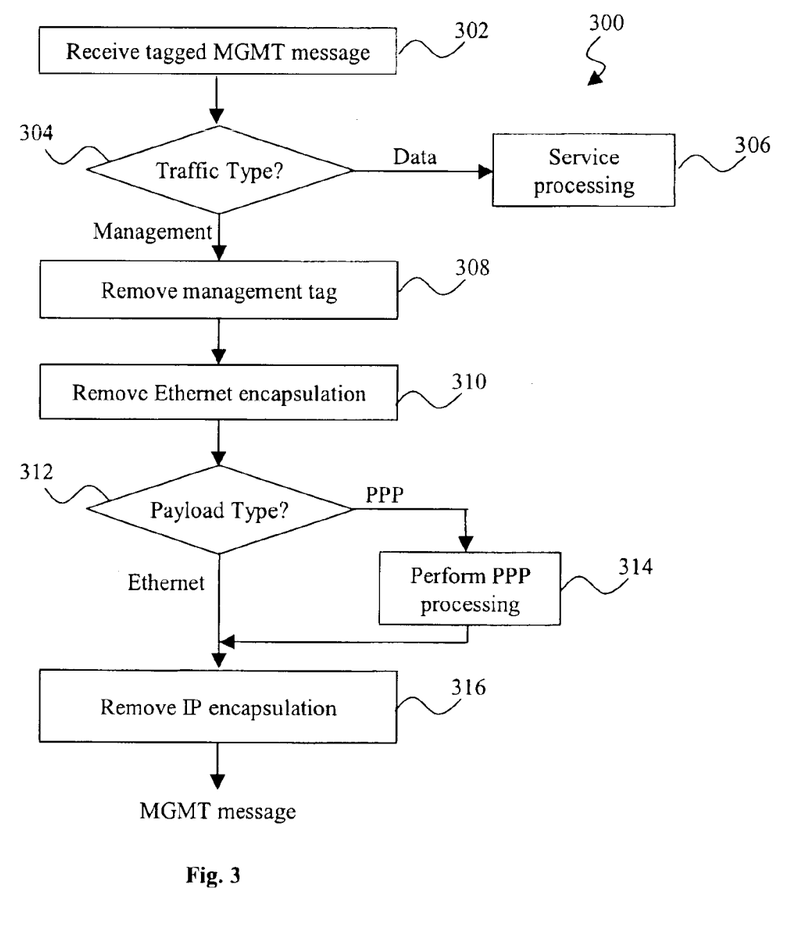
FIG. 3 is a flow chart of an exemplary method for receiving and extracting inband management channel information within the system of FIG. 1.
Figure 4:
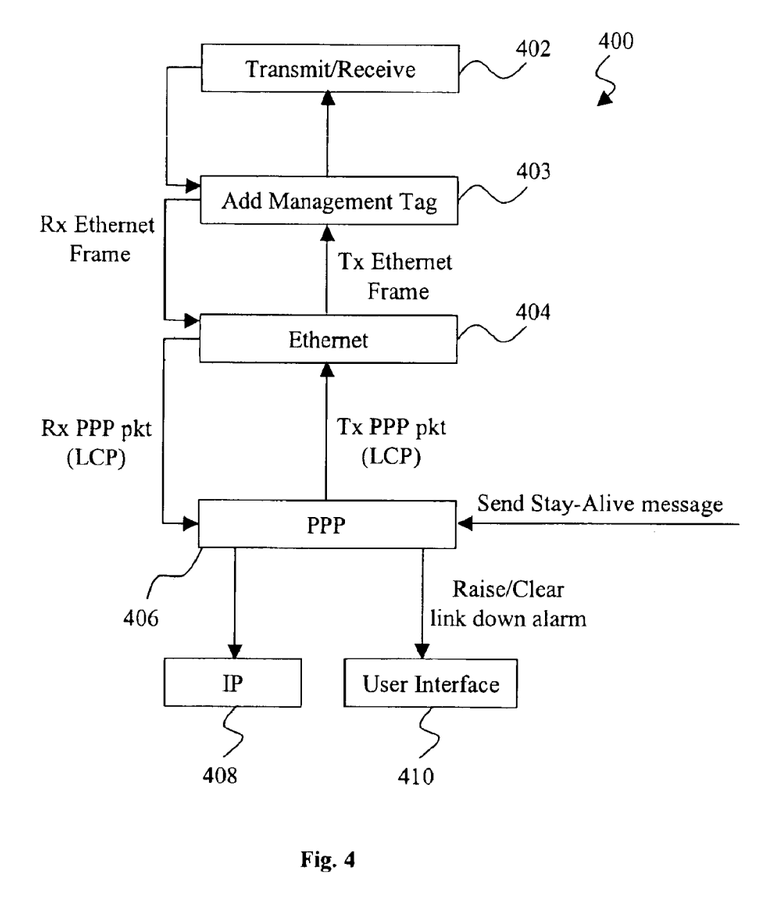
FIG. 4 is a flow chart of an exemplary method for link monitoring within the system of FIG. 1.

As will be described below in greater detail, the present example enables management tunnel information to be sent inband (e.g., along with user data) via the network 104. This may be accomplished using various encapsulation and tagging processes, as illustrated in FIGS. 2–4.

Figure 2:
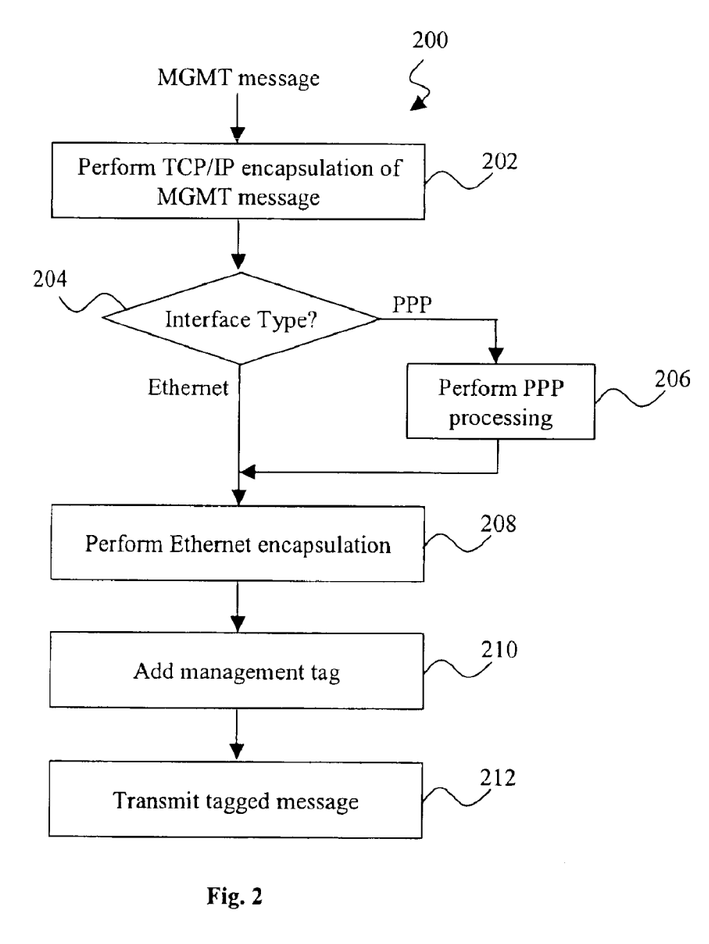
FIG. 2 is a flow chart of an exemplary method for encapsulating and transmitting inband management channel information within the system of FIG. 1.

Referring now to FIG. 2, an exemplary method 200 illustrates one process for sending a MGMT message inband (e.g., along with data (non-management) traffic) using the system of FIG. 1. It is understood that the disclosure may use the terms message, packet, and frame interchangeably for purposes of convenience. In the present example, the method 200 is performed using the Ethernet-over-SONET entity 102.

In step 202, a MGMT message that is to be transmitted is encapsulated in an IP packet. In step 204, a determination may be made as to what interface type is to be used to transmit the IP message. In the present example, this determination is based on whether the network entity 106 is an Ethernet-over-SONET entity or is a network entity that is not configured to perform PPP processing. If the interface type is Ethernet (e.g., the network entity 106 is not configured for PPP processing), the method continues to step 208, where the IP packet is encapsulated in an Ethernet packet. If the interface type is PPP (e.g., the network entity 106 is configured for PPP processing), the method continues to step 206, where packet processing may occur as defined by any applicable PPP parameters. The method may then continue to step 208, where the IP packet is encapsulated in an Ethernet packet.

In steps 210 and 212, a management tag (e.g., a VLAN management tag) may be added to the Ethernet frame and the message may be transmitted (e.g., to the network entity 106). The management tag enables the message to be routed within the system 100 properly. For example, if the message is not a MGMT message (e.g., its source or destination denote the VLANs 1 or 2), a VLAN identifier (e.g., a VID) may be assigned designating the destination VLAN (e.g., VID=1 or VID=2). However, if the message includes MGMT information, the message may be assigned a tag of VID=3 to indicate that the management VLAN 3 is to be used.

Referring now to FIG. 3, an exemplary method 300 illustrates one process for receiving an inband message and extracting MGMT information from the message. In step 302, a tagged message is received. In step 304, a determination may be made as to whether the message contains MGMT information. This determination may be made, for example, by examining the tag to determine if the VID is equal to 1 (data traffic), 2 (data traffic), or 3 (MGMT traffic). If the packet does not contain MGMT information, it may be passed on for service processing (e.g., routing to the appropriate VLAN) in step 306. If the packet does contain MGMT information, then the method 300 may continue to steps 308 and 310, where the management tag and the Ethernet encapsulation may be removed.

In step 312, a determination may be made as to the payload type (e.g., IP or PPP) of the packet. If the payload type is IP, the method 300 may continue to step 316, where the MGMT information may be extracted from the IP packet and sent to a user (e.g., the EMS/NMS 112). If the payload type is PPP, the method continues to step 314, where processing may occur as defined by any applicable PPP settings. The method 300 may then continue to step 316, where the MGMT information may be extracted from the IP packet.

As described above with respect to FIGS. 2 and 3, the encapsulation and tagging process enables MGMT information to be sent inband with data traffic. The Ethernet-over-SONET entity 102 may automatically select IP over Ethernet or IP over PPP over Ethernet, depending on the configuration of the network entity 106. It is understood that determining whether to use PPP may or may not occur, and the Ethernet-over-SONET entity may be configured to always use one or the other for a particular network entity or entities. Furthermore, it is understood that traffic may similarly flow in the opposite direction towards the Ethernet-over-SONET entity 102.

In some embodiments, the system 100 may use provisionable encapsulation PPP or Ethernet. In the current example, there are two tunnels per network entity with one media access control (MAC) number per tunnel (protected or unprotected), but it is understood that more or fewer tunnels and/or MACs may be used.

An address resolution protocol (ARP) cache may be implemented in the present embodiment with a predefined number of entries (e.g., 16 entries) per interface (protected or unprotected). In addition, ARP cache aging may be implemented. In the present embodiment, there may be no static ARP and no proxy ARP, but it is understood that these features may be included in some implementations. The present example also uses unnumbered IP Interfaces, provides peering with NOC routers using OSPF, and does not provide for advertising OLSA.

An exemplary TL1 command for use in the system 100 may be as follows: ENT-MGMTTNL:[<TID>]: <AID>:<CTAG>:::[BW=<bw>][, TVID=<tvid>], L2PRTCL=<l2prtcl>,[PADDR=<ipaddr>][,IPMASK= <ipmask>]:[<PST>]. L2PRTCL (layer 2 protocol) may be a read attribute, or may be read/write and able to take PPP or Ethernet values.

It is understood that embedding a management channel in the path layer may enable a hub site to terminate many paths, each of which may be terminated on a different remote site. The hub site may then have direct visibility of the multiple remote sites and act as a management gateway to these remote sites. Furthermore, the use of an embedded management channel may be used over any type of transport that may be used to carry data traffic. For example, a VLAN tagged management channel may be embedded in a DS3 Path that is carrying X.86 encoded Ethernet traffic.

Referring now to FIG. 4, in another embodiment, an exemplary method 400 illustrates one process for link establishment (monitoring and alarms) that may be used separately or in conjunction with the methods 200 and 300 described above. In the present example, the link establishment is only enabled if the encapsulation is IP over PPP over Ethernet (e.g., if both the network entities 102, 106 are Ethernet-over-SONET entities). As will be described, the method 400 starts a timer and sends periodic stay-alive messages and, if the remote system does not respond after a predefined number of consecutive stay-alive messages (e.g., 3), a link-down alarm may be reported to a user and/or IP routing software. This enables the software to find alternate routes for traffic.

A stay-alive message may be received at the PPP block 406. This triggers an outgoing PPP packet using LCP that is sent to the Ethernet block 404 for encapsulation. An Ethernet frame may be sent from the Ethernet block 404 to the transmit/receive block 402, which sends the message. In some embodiments, a management tag may be added using block 403 before the message is sent. When a message (e.g., a response) is received by the transmit/receive block 402, it is returned to the PPP block 406 via the Ethernet block 404 (and the Ethernet and PPP portions are stripped). If a predefined number of consecutive stay-alive messages (e.g., 3) are not responded to by the remote system to which the messages were sent, a link-down alarm may be reported to a user and/or IP routing software.

Figure 5:
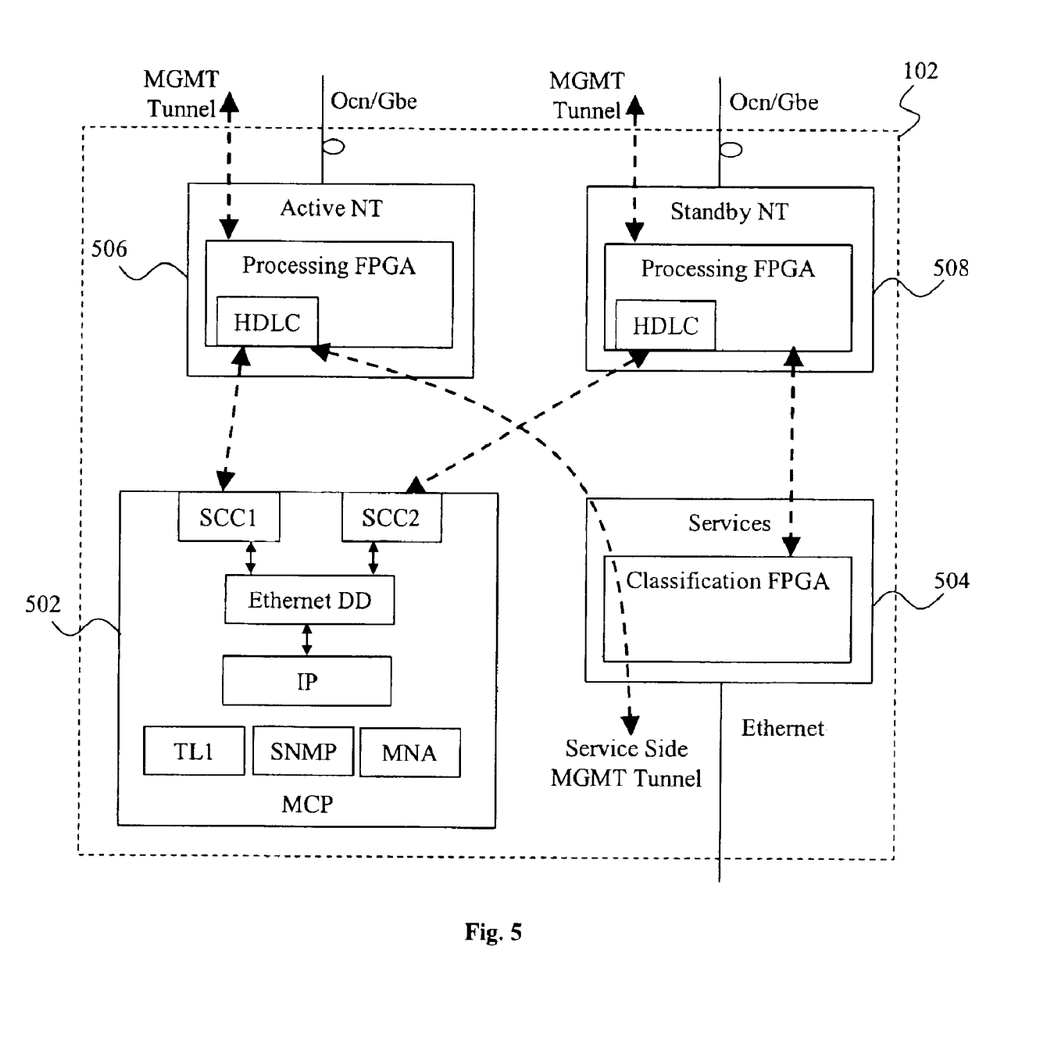
FIG. 5 illustrates exemplary components within one of the path terminating network entities of FIG. 1 that may be used to transmit and receive embedded management channel information.

Referring now to FIG. 5, in another embodiment, a more specific implementation of the Ethernet-over-SONET entity 102 of FIG. 1 is illustrated with four modules (e.g., cards), which may include software and/or hardware. In the present example, the four cards include a master control processor (MCP) card 502, a service(s) card 504, an active network transport (NT) card 506, and a standby NT card 508.

Figure 6:
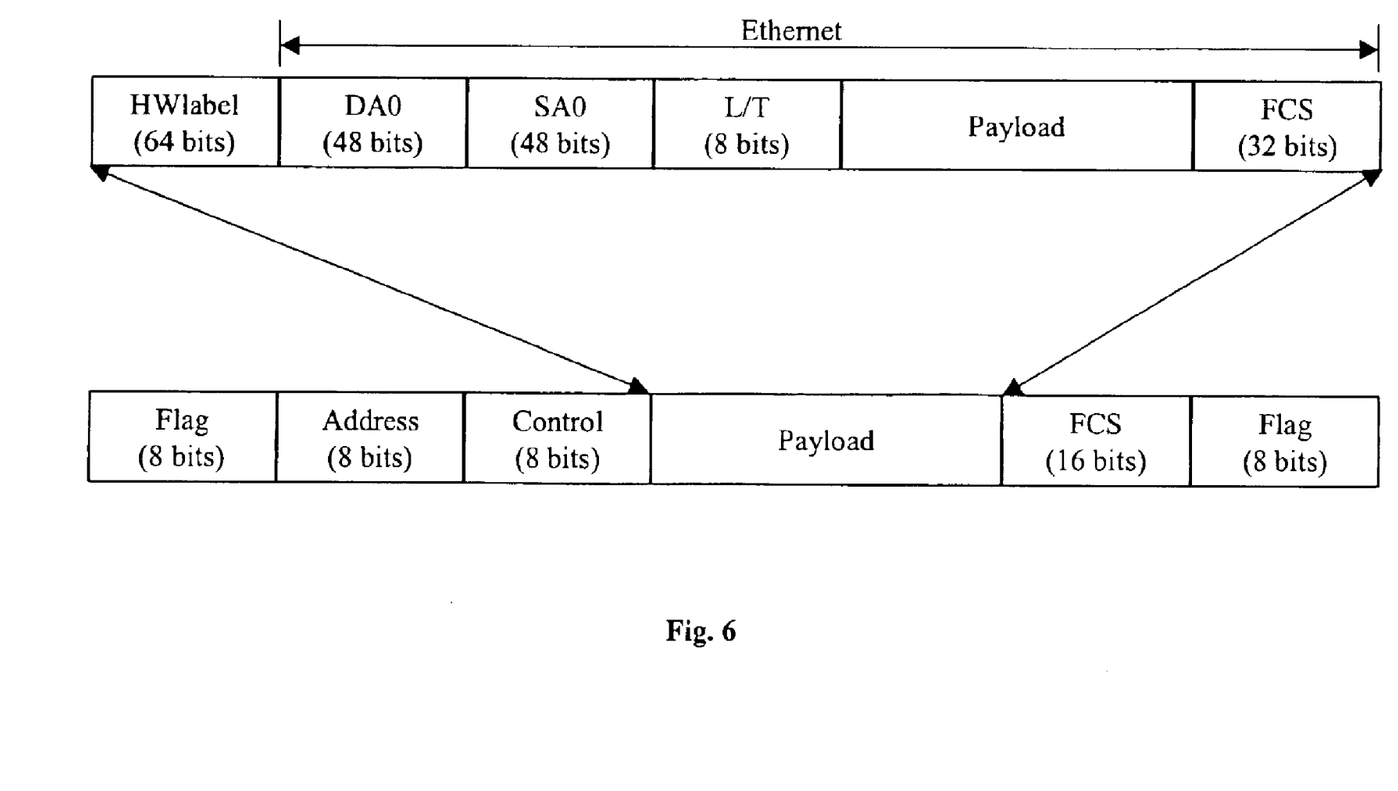
FIG. 6 illustrates an exemplary positioning of management channel information within a high-level data link control (HDLC) frame, such as may be used to transfer data between components of the network entity of FIG. 5.

The MCP card 502 may use two serial communication channels (denoted SCC1 and SCC2) as high-level data link control (HDLC) channels to connect to/from the NT cards 506, 508 in order to send and receive MGMT traffic. To transfer the traffic, the SCCs may be used to encapsulate the MGMT traffic in an HDLC frame, as is illustrated in FIG. 6. More specifically, an Ethernet device driver (Ethernet DD) on the MCP card 502 may instruct the SCCs to use an HDLC frame. It is understood that other encapsulation methods may be used. Furthermore, the HDLC encapsulation in the present example serves only to enable data transfer between the SCCs of the MCP 502 and the HDLCs of the active NT 506 and the standby NT 508.

In the present example, the SCCs may be programmed with a maximum baud rate (e.g., 2.8 Mbs). Each MGMT tunnel may have IP over Ethernet over HWlabel encapsulation (e.g., from the MCP card 502 to a Processing FPGA of the NT cards 506, 508, and vice versa) which is mapped to an SPE utilizing only a programmed bandwidth of the SPE capacity. The HWlabel may represent a label value of a port programmed in a hardware port-label table and may be prepended on the frame itself with address and frame attributes (e.g., service, VLAN destination, etc.). The encapsulation may be performed by the Ethernet DD. An exemplary Ethernet DD specification for this interface is as follows:

Supports Ethernet header format "SF, DA, SA, L/T, PAYLOAD, FCS" [e.g., start frame delimiter, destination address, source address, length/type, payload, frame check sequence].

SA and DA media access control (MAC) addresses may be zero, or an SA address may be used for all MGMF tunnels and a DA may be provisioned per tunnel. Furthermore, each MGMT tunnel may be provisioned with a VLAN.

Neither ARP nor RARP is supported.

FCS calculation is supported.

EthStats are not collected.

1500 bytes maximum transfer unit (MTU).

Transmit direction uses an interface index (ifIndex) as an index into a HWlabelTable to retrieve a corresponding HWlabel, pushes the HWlabel, and then transmits the frame on both SCCs (e.g., of the NT1 and NT2 cards). (The if Index is a table of interfaces that identifies various application interfaces, such as MGMT tunnels, DCCs, etc.).

On the receive direction, when a frame is received, the PROT_DTSCARD bit is checked. If it is equal to 1, the packet will be dropped since the frame was sent by the services card 504. Otherwise, the packet will be accepted by searching HWlabelTable for a match of the incoming HWlabel to find the corresponding ifIndex. If a match is found, the corresponding ifIndex and the IP packet are sent to the IP layer, otherwise the packet is dropped.

Each NT card 506, 508 may have an HDLC channel that may be used to connect to the MCP card 502 in order to send and receive MGMT traffic. In the present example, the MGMT traffic format is the same as the Ethernet services traffic format (of the service card 504) in order to present uniform traffic to a processing FPGA of one of the NT cards 506, 508. Accordingly, when an NT card 506, 508 receives a frame over an HDLC channel, the frame may be tagged with a HWLABEL by the MCP card 502 (and the HWLABEL may be calculated at provisioning time). The HWLABEL may then be used by the NT cards 506, 508 as an index into a lookup table to identify the carrying SPE and other related information. When the L2 processing FPGA receives traffic from the SONET processing engine, it uses the SPE, TVID, PRI (priority) indicators as an index into the lookup table to identify whether the traffic belongs to an Ethernet service or to a MGMT tunnel. If it belongs to a MGMT tunnel, the frame is sent to the MCP tagged with the HWLABEL, where the HWLABEL is used by the MCP to identify the MGMT tunnel receiving the traffic. The details are to be captured by the processing FPGA design.

Figure 7:
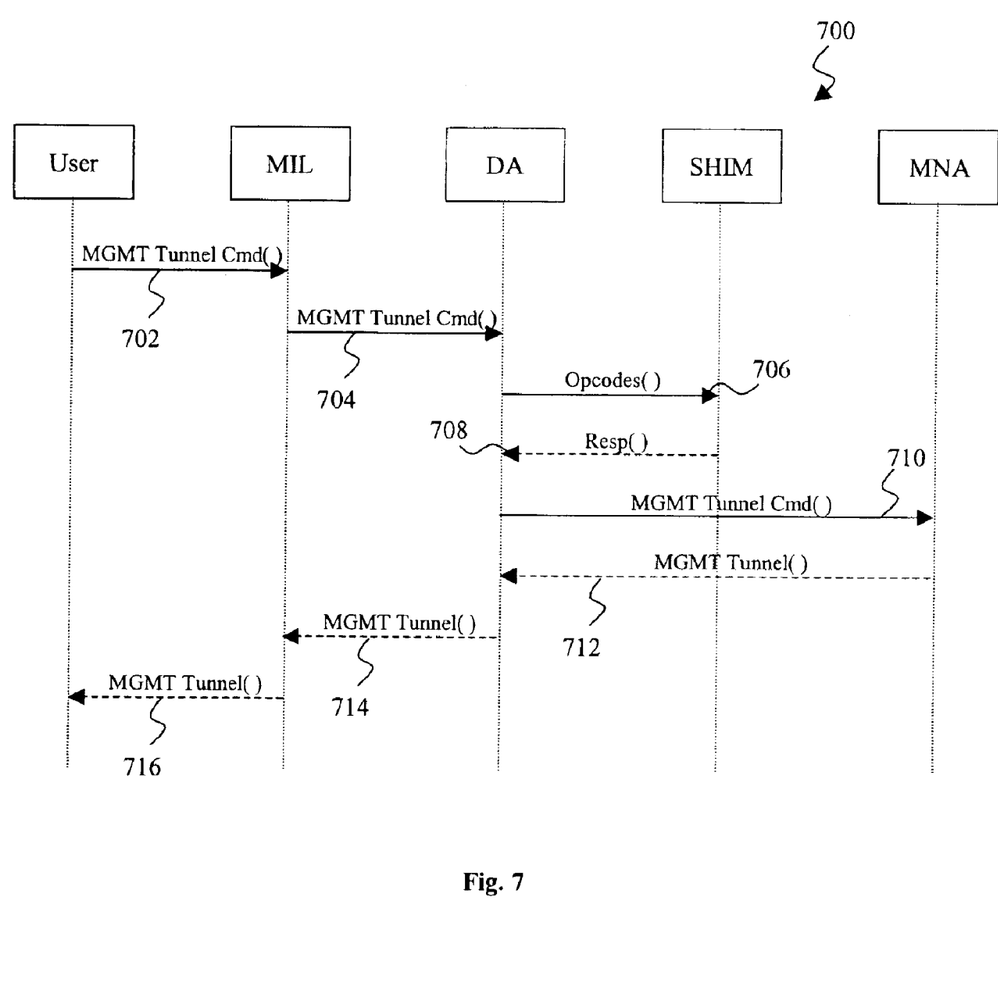
FIG. 7 is a sequence diagram illustrating an exemplary data flow for the establishment of a management tunnel.

Referring now to FIG. 7, in yet another embodiment, an exemplary data flow 700 between various subsystems handling the MGMT tunnels related commands, including a user, a management protocol layer (MPL)/management interface layer (MIL), a data application (DA), a simple hardware interface manager (SHIM), and a management network application (MNA). More specifically, in the present example, the provisioning of the MGMT tunnels (ENT/ED/RTRT/DLT-MGMT-TNL) may impact the MPL/MIL, the DA and the MNA SW sub-systems as follows.

The MPL/MIL may receive a MGMT tunnel command in step 702. When the MPL/MIL receives the MGMT tunnel command, it may validate the command based on the contents of a database and predefined provisioning rules. If the command is invalid, it may return the proper error message to the user. Otherwise, it starts a DB transaction, forwards the command to the DA in step 704, and waits for a response. If a positive response is received, it commits the transaction to the DB and replies to the user. Otherwise, it aborts the transaction and sends a response to the user indicating that the command is denied.

When the DA receives the command, it validates the command by checking one or more system parameters (e.g., a STS related parameter, BW, system TVID, etc.). If the command is invalid, it sends a deny response to the MIL. Otherwise, it interacts with the SHIM (steps 706, 708) and creates a HW label required by the FPGA with the following formats:

port=x (where x means "do not care");
size=correct bytes in the frame including HW label Ethernet FCS;
tag_cmd=x;
slot=x;
spe=x;
red=0;
pri=provisioned;
vid=provisioned;
hwL-parity=correct odd parity calculated for 63 bits;
encaps=x; and
que=x.

The SHIM provides hardware abstraction, enabling implementation changes to be made by only changing the SHIM.

The DA then forwards the command to the MNA (including the HW label) in step 710 and waits for a response. Note, the MGMT tunnel message sent by the MIL may have a place holder for the HW label so that the DA does not have to create a new message when it forwards the command to the MNA.

When the MNA receives the command, it may validate data such as the IP address. If the command is valid, it updates its local store and replies to the DA in step 712. Otherwise, it denies the command by sending a negative ACK to the DA. The MNA creates an Ethernet interface which binds the interface to the IP layer.

When the DA receives the response from MNA, it checks the response. If the response is negative, the DA deletes the MGMT tunnel and then forwards the response to the MIL in step 714. If the response is positive, the DA forwards the response to the MIL and updates the lookup table on the NT cards 506, 508. The updating may include:

Writes to free RAM entry cmd, enc, que, pri, and tvid;
Writes to the corresponding CAM entries port=X, slot=30, pri, and vid;
Writes to free RAM entry cmd, enc, que, pri, and tvid; and
Writes to the corresponding content addressable memory (CAM) entries port=X, slot=31, pri, and vid.

In still another embodiment, a network path (e.g., in the system 100 of FIG. 1) may not be carrying traffic or it may be undesirable to use an inband process as described above. For example, using an inband process for transferring management information may tie up resources for which a customer may be willing to pay. Accordingly, an alternative method for transferring information between path terminating network entities (e.g., the network entities 102, 106) may be desired.

In some examples, the management information may be inserted into various positions in a frame or packet, such as in the F2 User Channel byte and/or the Z1/Z2 growth bytes of the SONET path overhead. This enables the management information to be transferred between the path terminating network entities. While such embodiments may be implemented with both of the network entities 102, 106 as Ethernet-over-SONET entities configured to use PPP, other embodiments may not use PPP.

While the preceding description shows and describes one or more embodiments, it will be understood by those skilled in the art that various changes in form and detail may be made therein without departing from the spirit and scope of the present disclosure. For example, various specific implementations have been described for purposes of example, but the present disclosure is not limited to those implementations. Various types of encapsulation and tagging may be used to achieve the management tunnel connectivity between path terminating network entities as described in the present disclosure. Similarly, different network configurations may be used, as may different types of network entities. Furthermore, software instructions may be stored and/or executed by various network entities to perform various functions. For example, the methods of FIGS. 2–4 may include steps that are represented in software instructions and executed by various network entities of FIG. 1. Therefore, the claims should be interpreted in a broad manner, consistent with the present disclosure.

What is claimed is:

1. A method for transferring management channel information inband with data traffic over a synchronous optical network, the method comprising:

encapsulating management information in an internet protocol (IP) packet;

encapsulating the IP packet in an Ethernet frame;

tagging the Ethernet frame with a management tag to differentiate the frame from the data traffic; and sending the Ethernet frame via the network.

2. The method of claim 1 further comprising determining whether a network connection for sending the management information uses IP over Ethernet or IP over PPP over Ethernet, wherein the IP packet undergoes PPP processing if the network connection uses IP over PPP over Ethernet.

3. The method of claim 2 further comprising:

receiving the Ethernet frame from the network;

removing the management tag from the Ethernet frame;

determining whether the Ethernet frame was sent using IP over Ethernet or IP over PPP over Ethernet, wherein the Ethernet frame undergoes PPP processing if the packet was sent using IP over PPP over Ethernet;

converting the Ethernet frame into an IP packet; and extracting the management information from the IP packet.

4. The method of claim 1 further comprising:

receiving the Ethernet frame from the network;

removing the management tag from the Ethernet frame;

extracting the IP packet from the Ethernet frame; and extracting the management information from the IP packet.

5. The method of claim 4 further comprising determining whether the Ethernet frame contains management information and sending the Ethernet frame to a service processor if the Ethernet frame contains no management information.

6. The method of claim 1 wherein the management tag is a virtual local area network (VLAN) tag.

7. The method of claim 6 further comprising routing the Ethernet frame via a VLAN identified by the VLAN tag.

8. The method of claim 1 wherein the management tag is a multiprotocol label switching (MPLS) label.

9. The method of claim 1 further comprising encapsulating the Ethernet frame in a high-level data link control (HBLC) packet for transmission via an HDLC channel.

10. A system for transferring management channel information inband with data traffic over a synchronous optical network, the system comprising:

first and second path terminating network entities connected via the network;

first and second virtual local area networks (VLANs), wherein a portion of each VLAN includes the first and second network entities; and wherein the first VLAN is for data traffic and the second VLAN is for management traffic; and software for managing the transfer of management information between the first and second network entities, the software including:

instructions for encapsulating management information in an internet protocol (IP) packet;

instructions for encapsulating the IP packet in an Ethernet frame;

instructions for tagging the Ethernet frame with a management tag to designate the frame for the second VLAN; and instructions for sending the Ethernet frame via the network.

11. The system of claim 10 wherein the first network entity is configured for point-to-point protocol (PPP) processing, and wherein the second network entity is not configured for PPP processing.

12. The system of claim 10 wherein both the first and second network entities are configured for point-to-point protocol (PPP) processing.

13. The system of claim 10 further comprising instructions for determining whether the first and second network entities are connected via an interface using internet protocol (IP) over Ethernet or IP over point-to-point protocol (PPP) over Ethernet, wherein the IP packet undergoes PPP processing if the network connection uses IP over PPP over Ethernet.

14. The system of claim 13 further comprising:

instructions for receiving the Ethernet frame from the network;

instructions for removing the management tag from the Ethernet frame;

instructions for determining whether the Ethernet frame was sent using IP over Ethernet or IP over PPP over Ethernet, wherein the Ethernet frame undergoes PPP processing if the packet was sent using IP over PPP over Ethernet;

instructions for extracting the IP packet from the Ethernet frame; and instructions for extracting the management information from the IP packet.

15. The system of claim 10 further comprising:

instructions for receiving the Ethernet frame from the network;

instructions for removing the management tag from the Ethernet frame;

instructions for extracting the IP packet from the Ethernet frame; and instructions for extracting the management information from the IP packet.

16. The method of claim 10 wherein the first network entity further includes instructions for encapsulating the Ethernet frame in a high-level data link control (HDLC) packet for transmission via an HDLC channel.

* * * * *

UNITED STATES PATENT AND TRADEMARK OFFICE
CERTIFICATE OF CORRECTION

PATENT NO. : 6,888,798 B2
DATED : May 3, 2005
INVENTOR(S) : Jamieson et al.

It is certified that error appears in the above-identified patent and that said Letters Patent is hereby corrected as shown below:

Column 5,
Line 36, "<12prtcl>" should read -- <I2prtcl> --.
Line 36, "[PADDR=" should read -- [,IPADDR= --.

Column 6,
Line 49, "MGMF" should read -- MGMT --.
Lines 61 and 62, "if Index" should read -- ifIndex --.
Line 65, "DTSCARD" should read -- DISCARD --.

Column 9,
Line 42, "(HBLC)" should read -- (HDLC) --.

Signed and Sealed this

Fifth Day of July, 2005

JON W. DUDAS
*Director of the United States Patent and Trademark Office*